US012795434B2

(12) United States Patent
Tamaki et al.

(10) Patent No.: US 12,795,434 B2
(45) Date of Patent: Nov. 10, 2026

(54) SYSTEM AND METHOD FOR MEASURING AND DETERMINING OCCURRENCE OF ABNORMALITY

(71) Applicant: HITACHI CONSTRUCTION MACHINERY CO., LTD., Tokyo (JP)

(72) Inventors: Satoshi Tamaki, Tokyo (JP); Hirotake Ishii, Tokyo (JP); Hidefumi Ishimoto, Tsuchiura (JP); Akiyoshi Kirimura, Tsuchiura (JP); Yuusuke Eguchi, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 225 days.

(21) Appl. No.: 18/853,900

(22) PCT Filed: Apr. 5, 2023

(86) PCT No.: PCT/JP2023/014090
§ 371 (c)(1),
(2) Date: Oct. 3, 2024

(87) PCT Pub. No.: WO2023/195486
PCT Pub. Date: Oct. 12, 2023

(65) Prior Publication Data

US 2025/0234236 A1 Jul. 17, 2025

(30) Foreign Application Priority Data

Apr. 7, 2022 (JP) ................................. 2022-063794

(51) Int. Cl.
*H04W 28/02* (2009.01)
*H04W 24/10* (2009.01)
(Continued)

(52) U.S. Cl.
CPC ....... *H04W 28/0226* (2013.01); *H04W 24/10* (2013.01); *H04W 28/0268* (2013.01);
(Continued)

(58) Field of Classification Search
CPC . H04W 28/00; H04W 28/02; H04W 28/0226; H04W 24/00; H04W 24/10;
(Continued)

(56) References Cited

U.S. PATENT DOCUMENTS 5,603,093 A 2/1997 Yoshimi et al.
2015/0341812 A1* 11/2015 Dion ................. H04N 21/6373 370/252

(Continued)

FOREIGN PATENT DOCUMENTS

CN 112367681 * 2/2021 ............ H04W 24/08
CN 112887910 * 6/2021 ............ H04W 4/021
(Continued)

OTHER PUBLICATIONS

International Search Report of PCT/JP2023/014090 dated May 16, 2023.

*Primary Examiner* — Warner Wong
(74) *Attorney, Agent, or Firm* — MATTINGLY & MALUR, PC

(57) ABSTRACT

A plurality of mobile vehicles or a stationary wireless station connected to the plurality of mobile vehicles by wireless communication periodically measures position information and wireless communication quality information indicative of quality of the wireless communication, and reports the measurement results to the control station. The control station groups measurement results belonging to a first time range among the measurement results reported from the plurality of mobile vehicles based on the position information, and learns a distribution of the wireless communication
(Continued)

quality information for each grouped position range. The control station obtains a measurement result belonging to a second time range different from the first time range among the measurement results reported from the plurality of mobile vehicles, and derives an outlier abundance ratio in the measurement result belonging to the second time range using the distribution of the wireless communication quality information for each of the learnt position ranges.

9 Claims, 16 Drawing Sheets

(51) Int. Cl.
*H04W 64/00* (2009.01)
*H04L 41/142* (2022.01)
*H04L 41/5009* (2022.01)

(52) U.S. Cl.
CPC ......... *H04W 64/006* (2013.01); *H04L 41/142* (2013.01); *H04L 41/5009* (2013.01)

(58) Field of Classification Search
CPC . H04W 64/00; H04W 64/006; H04W 52/225; H04W 68/04; H04W 41/50; H04W 41/5003; H04W 41/5009; H04W 41/5012; H04W 41/5016; H04W 28/095; H04L 41/00; H04L 41/14; H04L 41/142; H04L 41/5067; H04L 47/822; H04B 17/26
See application file for complete search history.

(56) References Cited

U.S. PATENT DOCUMENTS

| | | | | |
|---|---|---|---|---|
| 2022/0337329 | A1* | 10/2022 | Kudo | H04B 1/3827 |
| 2023/0194279 | A1* | 6/2023 | Kakosyan | G01C 21/3461 701/411 |

FOREIGN PATENT DOCUMENTS

| | | | | |
|---|---|---|---|---|
| DE | 19950641 | A1 * | 5/2001 | H04W 24/00 |
| JP | 08-237729 | A | 9/1996 | |
| JP | 2004-297722 | A | 10/2004 | |
| JP | 2014-072683 | A | 4/2014 | |
| JP | 2015-092685 | A | 5/2015 | |
| JP | 2015-210595 | A | 11/2015 | |
| JP | 2020-141330 | A | 9/2020 | |

* cited by examiner

Fig. 4A

| |
|---|
| Time |
| Positional Coordinate |
| Wireless Mobile Station ID |
| Downlink Reception Electric Power |
| Downlink SNR |

Fig. 4B

| |
|---|
| Time |
| Positional Coordinate |
| Wireless Mobile Station ID |
| Downlink Reception Electric Power (A) |
| Downlink SNR (A) |
| Downlink Reception Electric Power (B) |
| Downlink SNR (B) |
| Downlink Reception Electric Power (C) |
| Downlink SNR (C) |

Fig. 4C

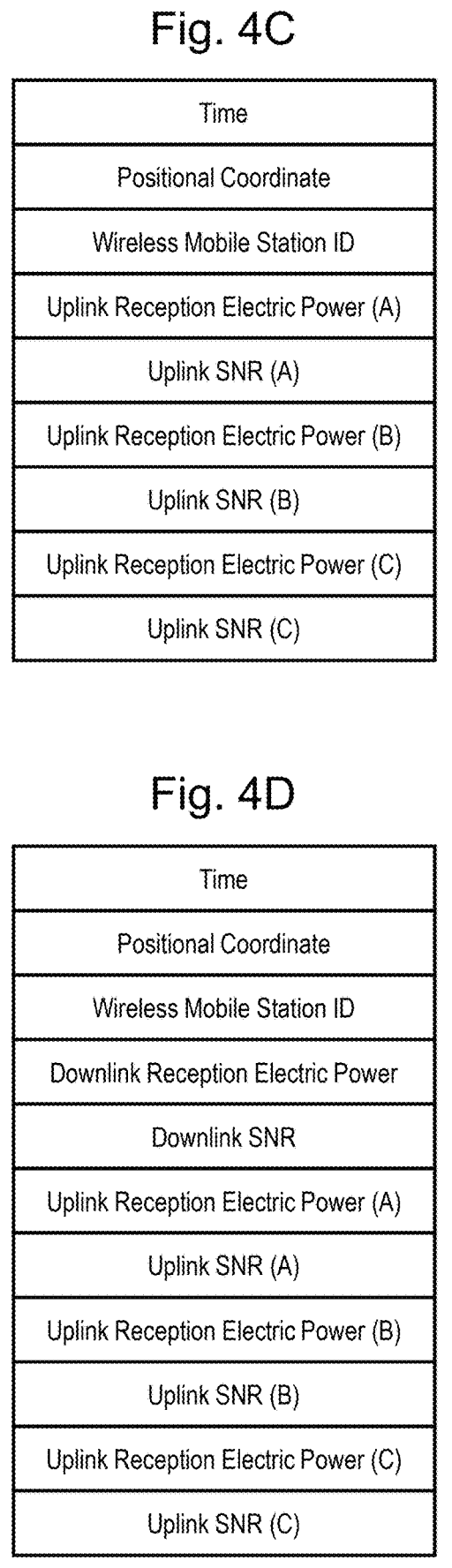

| |
|---|
| Time |
| Positional Coordinate |
| Wireless Mobile Station ID |
| Uplink Reception Electric Power (A) |
| Uplink SNR (A) |
| Uplink Reception Electric Power (B) |
| Uplink SNR (B) |
| Uplink Reception Electric Power (C) |
| Uplink SNR (C) |

Fig. 4D

| |
|---|
| Time |
| Positional Coordinate |
| Wireless Mobile Station ID |
| Downlink Reception Electric Power |
| Downlink SNR |
| Uplink Reception Electric Power (A) |
| Uplink SNR (A) |
| Uplink Reception Electric Power (B) |
| Uplink SNR (B) |
| Uplink Reception Electric Power (C) |
| Uplink SNR (C) |

Fig. 4E

| |
|---|
| Time |
| Positional Coordinate |
| Wireless Mobile Station ID |
| Downlink Reception Electric Power (A) |
| Downlink SNR (A) |
| Downlink Reception Electric Power (B) |
| Downlink SNR (B) |
| Downlink Reception Electric Power (C) |
| Downlink SNR (C) |
| Uplink Reception Electric Power (A) |
| Uplink SNR (A) |
| Uplink Reception Electric Power (B) |
| Uplink SNR (B) |
| Uplink Reception Electric Power (C) |
| Uplink SNR (C) |

SYSTEM AND METHOD FOR MEASURING AND DETERMINING OCCURRENCE OF ABNORMALITY

TECHNICAL FIELD

The present invention relates to a wireless communication system, a wireless communication method, and a control station constituting the wireless communication system that are used to control a mobile object.

BACKGROUND ART

In recent years, wireless communication is used for various objectives in various environments. As one type of usage of the wireless communication, there is a control system that collects information from a plurality of mobile objects, such as vehicles, in a central control station and controls moves of the respective mobile objects.

In the control system, if a disruption occurs in the wireless communication for a vehicle that is under the control from the central control station, not only the control from the central control station on the vehicle fails to be sufficiently performed, but also the central control station fails to obtain necessary information for performing the control from the vehicle. In addition, the communication disruption in one vehicle may affect the control on another vehicle. In view of this, when the wireless communication is applied to the control system or the like, it is significantly important not to cause the communication disruption and to ensure reliability of the wireless communication.

Meanwhile, propagation of a radio wave used in the wireless communication is largely affected by constructions and the like present in a propagation region. Additionally, moves, deformations, and the like of the constructions and the like vary the propagation of the radio wave, and eventually, quality of the wireless communication, and cause the communication disruption. Presence/absence and frequency of the occurrence of the communication disruption differ by position, and also vary over time. In view of this, there has been proposed a technique that measures communication quality during communication and takes an action based on the measurement result in order to ensure reliability of the wireless communication.

For example, Patent Literature 1 discloses a wireless communication technique that ensures reliability of wireless communication even in a mine with a poor radio wave condition to enable a dump truck to smoothly travel in an autonomous manner by setting a travel permitted area when communication quality satisfies predetermined quality in an autonomous travel dump truck in a mine. That is, in the technique disclosed in the Patent Literature 1, the connection condition is determined based on the communication quality measured in the autonomous travel dump truck in a mine, and when the communication quality satisfies the predetermined quality, traveling in the predetermined travel permitted area is permitted, and thus, the dump truck is enabled to smoothly travel in an autonomous manner.

However, the technique disclosed in Patent Literature 1 is a technique to detect variations in radio wave propagation in association with moves and deformations of constructions and the like, and moreover, variations in quality of the wireless communication in association with abnormality in equipment or the like in an ex-post manner, thereby having a problem of possibility of a case where an intended control fails to be executed depending on the cause of the communication quality variations.

CITATION LIST

Patent Literature

Patent Literature 1: JP 2015-210595 A

SUMMARY OF INVENTION

Technical Problem

In order to solve the aforementioned problem, an objective of the present invention is to provide a wireless communication system, a wireless communication method, and a control station constituting the wireless communication system that enable to detect variations in communication quality before the communication quality fails to satisfy predetermined quality, and have high reliability.

Solution to Problem

A wireless communication system according to the present invention is a wireless communication system in a control system including a control station and a plurality of mobile vehicles connected to the control station via wireless communication. The plurality of mobile vehicles or a stationary wireless station connected to the plurality of mobile vehicles by wireless communication periodically measures position information and wireless communication quality information, and reports the measurement results to the control station. The control station groups measurement results belonging to a first time range among the measurement results reported from the plurality of mobile vehicles based on the position information, and learns a distribution of the wireless communication quality information indicative of quality of the wireless communication for each grouped position range. The control station further obtains a measurement result belonging to a second time range different from the first time range among the measurement results reported from the plurality of mobile vehicles, and derives an outlier abundance ratio in the measurement result belonging to the second time range using the distribution of the wireless communication quality information for each of the learnt position ranges. The present system includes an abnormality detecting device that determines abnormality detection based on the outlier abundance ratio.

Advantageous Effects of Invention

The present invention enables to provide a wireless communication system, a wireless communication method, and a control station constituting the wireless communication system that have high reliability in wireless communication used for controlling a mobile object.

BRIEF DESCRIPTION OF DRAWINGS

FIG. 4A is an exemplary information structure stored in a wireless station information storing section according to the embodiment of the present invention.

FIG. 4B is an exemplary information structure stored in the wireless station information storing section according to the embodiment of the present invention.

FIG. 4C is an exemplary information structure stored in the wireless station information storing section according to the embodiment of the present invention.

FIG. 4D is an exemplary information structure stored in the wireless station information storing section according to the embodiment of the present invention.

FIG. 4E is an exemplary information structure stored in the wireless station information storing section according to the embodiment of the present invention.

DESCRIPTION OF EMBODIMENTS

Figure 1:
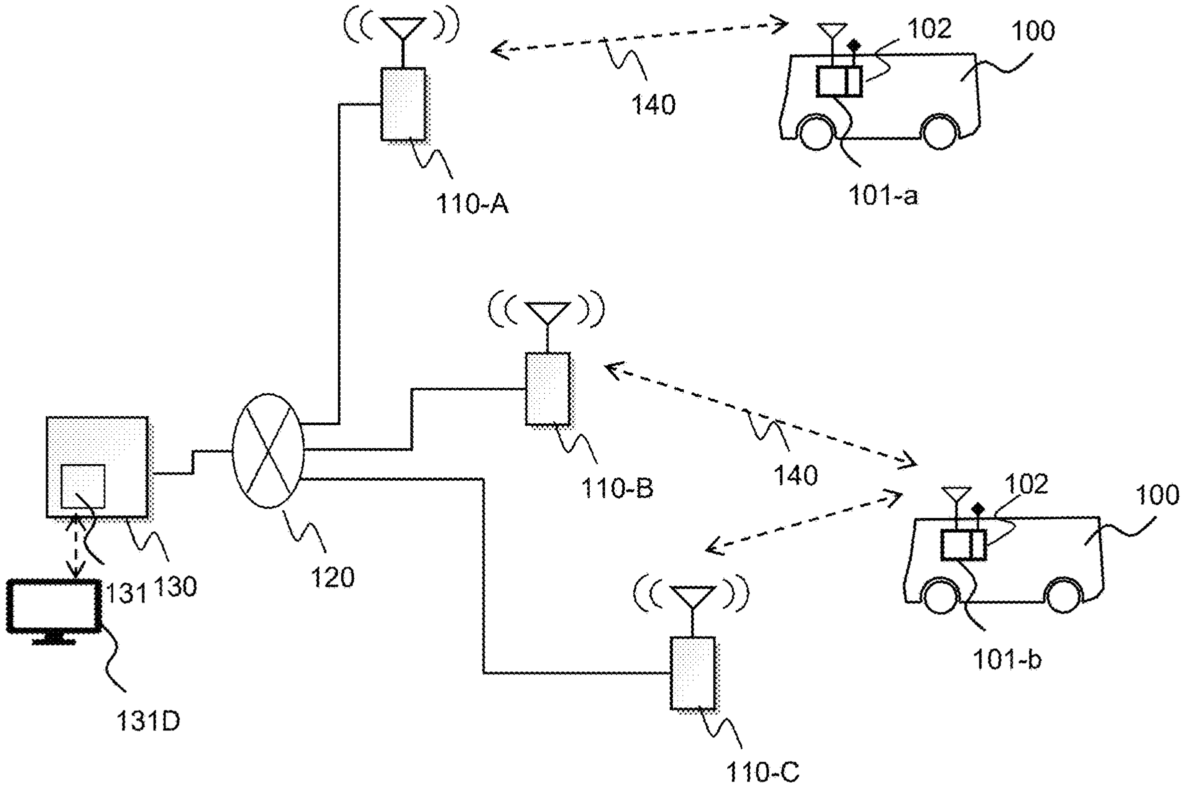
FIG. 1 is a schematic diagram of a wireless communication system configuration according to an embodiment of the present invention.

The following describes an embodiment of the present invention by referring to the drawings. While in the following embodiment, components that are plural may be exemplarily described to be the specific number, the number of components may be different from that in the exemplary description unless it is limited by specific indication.

While in the following embodiment, a process may be described in a specific order, unless there is dependence on the order, such as a result of a certain process is used in another process, the order of the process may be interchanged or the processes may be concurrently executed. Furthermore, even when a latter process uses the result of a former process, the respective processes may be asynchronously executed and the latest former process execution result at the time point of the latter process execution may be used in the latter process.

FIG. 1 is a schematic diagram of a wireless communication system configuration according to an embodiment of the present invention. The wireless communication system according to the embodiment is constituted including mobile vehicles 100, stationary wireless stations 110, a stationary network 120, a control station 130, and a mobile network 140.

The mobile vehicle 100 includes a mobile wireless station 101 (101-*a*, 101-*b*) and a position sensor 102. The control station 130 includes an abnormality detecting device 131. The abnormality detecting device 131 may include a display (a display section 131D) that shows a result of abnormality detection. The mobile wireless station 101 and the stationary wireless station 110 are connected by means of wireless communication via the mobile network 140, and the stationary wireless station 110 and the control station 130 are connected by means of wired communication or wireless communication via the stationary network 120. While FIG. 1 illustrates three stationary wireless stations 110 (110-A, 110-B, 110-C) and two mobile vehicles 100, it is needless to say that the numbers are not limited to these.

Any or both of the mobile wireless station 101 and the stationary wireless station 110 measure the wireless communication quality of the mobile network 140, and periodically notify the abnormality detecting device 131 within the control station 130 through any or both of the stationary network 120 and the mobile network 140 of wireless communication quality information as the measurement result. The wireless communication quality information is information relating to the quality of wireless communication between the mobile wireless station 101 and the stationary wireless station 110, and, as one example, includes a reception electric power and a SNR (Signal-to-Noise Ratio: a ratio of a signal to a noise power) and includes the information of the time at which the wireless communication quality is measured. The wireless communication quality information obtained in the mobile wireless station 101 may include an ID of the mobile wireless station 101 that has taken the measurement.

When distinction is necessary below, the wireless communication quality, the reception electric power, and the SNR measured in the stationary wireless station 110 are referred to as "uplink wireless communication quality," an "uplink reception electric power," and an "uplink SNR," respectively. The wireless communication quality, the reception electric power, and the SNR measured in the mobile wireless station 101 are referred to as "downlink wireless communication quality," an "downlink reception electric power," and an "downlink SNR," respectively.

The stationary wireless station 110 measures the wireless communication quality as quality of wireless communication between each of the mobile wireless stations 101 as a communication target and itself. While the wireless communication quality information is not limited to specific information, it, for example, includes the ID of the mobile wireless station 101 as the communication target. The wireless communication quality information may include position information of the mobile vehicle 100 measured by using the position sensor 102, for example, a GNSS (Global Navigation Satellite System).

The mobile wireless station 101 or the stationary wireless station 110 adds time information on the measured position information, and notifies the abnormality detecting device 131 within the control station 130 of the information through the mobile network 140 and/or the stationary network 120. The abnormality detecting device 131 executes an abnormality detection process of the wireless communication system based on the notified wireless communication quality information and position information.

While in the example described above, the position information of the mobile vehicle 100 is measured using the position sensor 102, instead of this or in addition to this, for example, the measurement may be taken on the side of the stationary wireless station 110 using an arrival time difference of radio wave and an arrival direction of radio wave, and the position of the mobile wireless station 101 and the mobile vehicle 100 may be measured based on this. In this case, the time information is added on the position information measured by the stationary wireless station 110, and the abnormality detecting device 131 within the control station 130 is notified of the information after the addition through the stationary network 120.

Figure 2:
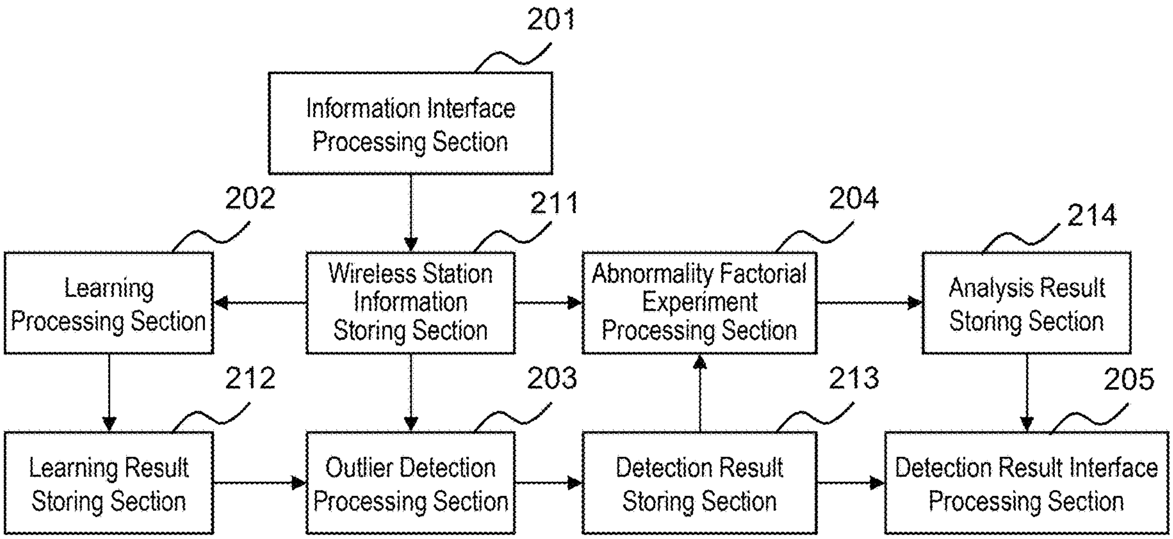
FIG. 2 is a schematic diagram of an abnormality detecting device according to the embodiment of the present invention.

With reference to a block diagram in FIG. 2, a configuration of the abnormality detecting device 131 will be described in further detail. The abnormality detecting device 131 includes processing sections, such as an information interface processing section 201, a learning processing section 202, an outlier detection processing section 203, an abnormality factorial experiment processing section 204, and a detection result interface processing section 205, as one example. The abnormality detecting device 131 includes a wireless station information storing section 211, a learning result storing section 212, a detection result storing section 213, and an analysis result storing section 214 as storing sections that store information.

Figure 3:
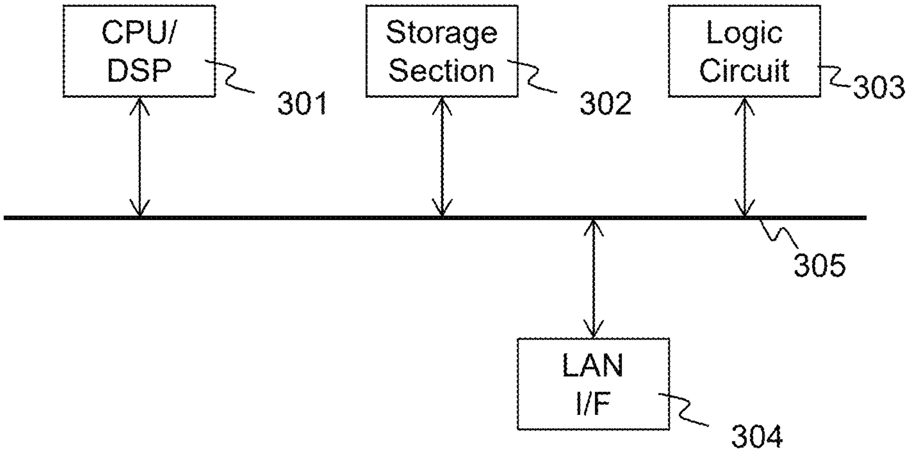
FIG. 3 is a schematic diagram of a hardware configuration of the abnormality detecting device according to the embodiment of the present invention.

FIG. 3 is a schematic diagram of a hardware configuration for achieving the abnormality detecting device 131. The abnormality detecting device 131 according to the embodiment includes, for example, a CPU/DSP 301, a storage section 302, a logic circuit 303, a LAN I/F 304, and a bus 305 that connects these respective sections as the hardware configuration.

Various operations, determinations, and inputs/outputs in the information interface processing section 201, the learning processing section 202, the outlier detection processing section 203, the abnormality factorial experiment processing section 204, and the detection result interface processing section 205 are executed using resources of the CPU/DSP 301, the storage section 302, and the logic circuit 303 in accordance with computer programs stored in, for example, the storage section 302. Each of the processes by the abnormality detecting device 131 is preferred to independently operate as a process or a thread that differs by each or some processes.

The wireless station information storing section 211, the learning result storing section 212, the detection result storing section 213, and the analysis result storing section 214 store respective information in the storage section 302. The storage section 302 may, for example, include a volatile memory, such as a RAM (Random Access Memory), a non-volatile memory, such as an SSD (Solid State Drive), a magnetic storage device, such as an HDD (Hard Disk Drive), and the like.

The information interface processing section 201 and the detection result interface processing section 205 as the respective interface processing sections of the abnormality detecting device 131 exchange information with the outside of the abnormality detecting device 131 via the LAN I/F 304. The information interface processing section 201 receives the position information of the mobile vehicle 100 obtained by measurement by the position sensor 102 through the stationary network 120 and the wireless communication quality information of the mobile network 140 obtained by measurement in any or both of the mobile wireless station 101 and the stationary wireless station 110. When the wireless communication quality information does not include the time information, the information interface processing section 201 adds the time information on the received information and stores the data in the wireless station information storing section 211.

The wireless station information storing section 211 associates the wireless communication quality information with the position information based on the time information and stores the information. Here, for example, when obtaining frequency of the position information is less than obtaining frequency of the wireless communication quality information, the interpolated position information can be associated with the wireless communication quality information.

FIG. 4A to FIG. 4E illustrate exemplary data structures of the information stored in the wireless station information storing section 211. While FIG. 4A to FIG. 4E exemplarily describe the case where two types of values, a reception electric power and an SNR are used as the wireless communication quality, another reception quality index may be used.

FIG. 4A is an example of a data structure of information when the mobile network 140 employs a wireless communication scheme in which the plurality of different stationary wireless stations 110 transmit signals of the same channel not necessary to be distinguished on the mobile wireless station 101 side, such as an SFN (Single Frequency Network), and the mobile wireless station 101 measures the wireless communication quality. At this time, the wireless station information storing section records a combination of a time, a positional coordinate, a wireless mobile station ID, a downlink reception electric power, and a downlink SNR, by using the time and the mobile station ID as the key, as illustrated in FIG. 4A.

FIG. 4B is an example of a case where the mobile network 140 employs a wireless communication scheme in which the plurality of different stationary wireless stations 110 transmit signals of different channels necessary to be distinguished on the mobile wireless station 101 side, such as a wireless LAN (Local Area Network) and a cellular communication, and the mobile wireless station 101 side measures the wireless communication quality. At this time, the wireless station information storing section 211 records a combination of a time, a positional coordinate, a wireless mobile station ID, and a downlink reception electric power and a downlink SNR of each of the stationary wireless stations 110 ((A) to (C)), by using the time and the mobile station ID as the key, as illustrated in FIG. 4B. When the reception of the signal from a specific stationary wireless station 110 has failed in the mobile wireless station 101, the wireless communication quality relating to the stationary wireless station 110 is handled as a missing value.

FIG. 4C is an example of the case where the stationary wireless station 110 side measures the wireless communication quality. At this time, the wireless station information storing section 211 records a combination of a time, a positional coordinate, a wireless mobile station ID, and an uplink reception electric power and an uplink SNR of each of the stationary wireless stations 110 that have been measured, by using the time and the mobile station ID as the key, as illustrated in FIG. 4C. When the reception of the signal from the mobile wireless station 101 has failed in a specific stationary wireless station 110, the wireless communication quality relating to the stationary wireless station 110 is handled as a missing value.

FIG. 4D is an example of a data structure of information when the mobile network 140 employs a wireless communication scheme in which the plurality of different stationary wireless stations 110 transmit signals of the same channel not necessary to be distinguished on the mobile wireless station 101 side, such as an SFN (Single Frequency Network), and both the mobile wireless station 101 and the stationary wireless station 110 measure the wireless communication quality. At this time, the wireless station information storing section 211 records a combination of a time, a positional coordinate, a wireless mobile station ID, a downlink reception electric power, a downlink SNR, and an uplink reception electric power and an uplink SNR of each of the stationary wireless stations 110, by using the time and the mobile station ID as the key, as illustrated in FIG. 4D. Handling the failure of signal reception as a missing value is similar to the case of FIG. 4C.

FIG. 4E is an example of a data structure of information when the mobile network 140 employs a wireless communication scheme in which the plurality of different stationary wireless stations 110 transmit signals of different channels necessary to be distinguished on the mobile wireless station 101 side, such as a wireless LAN (Local Area Network) and a cellular communication, and both the mobile wireless station 101 and the stationary wireless station 110 measure the wireless communication quality. At this time, the wireless station information storing section 211 records a combination of a time, a positional coordinate, a wireless mobile station ID, a downlink reception electric power and a downlink SNR of each of the stationary wireless stations 110, and an uplink reception electric power and an uplink SNR of each of the stationary wireless stations 110, by using the time and the mobile station ID as the key, as illustrated in FIG. 4E. Handling the failure of signal reception as a missing value is similar to the cases of FIG. 4B and FIG. 4C.

The learning processing section 202 extracts the information stored in the wireless station information storing section 211 for each constant time range and each constant position range, learn respective distributions of representative wireless communication quality, and stores the learnt results in the learning result storing section 212.

Figure 5:
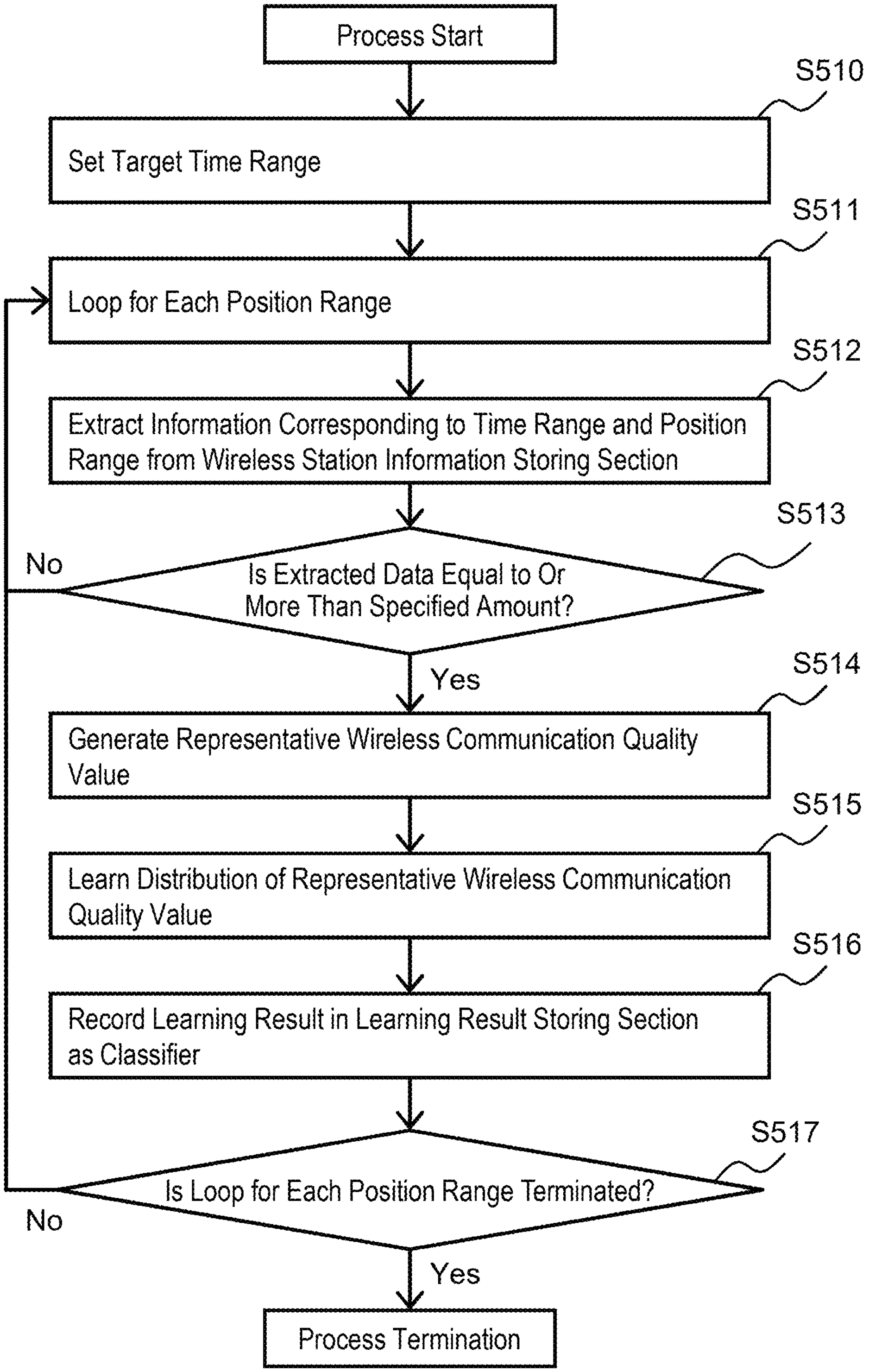
FIG. 5 is an exemplary process procedure of a learning process in the embodiment of the present invention.

With reference to the flowchart in FIG. 5, an exemplary procedure of the learning process of the learning processing section 202 according to the embodiment will be described. The learning processing section 202 firstly sets a time range as a learning target at Step S510. Here, the time range of the learning target indicates, for example, a range of 24 hours on a specific day.

Next, a loop process (grouping) is executed for each position range from Step S511 to Step S517. At Step S512, the data corresponding to the time range set at Step S510 and the position range of the current loop process is extracted from the wireless station information storing section 211. At subsequent Step S513, a data amount of the extracted data is confirmed, and when the data amount is less than a specified value, for example, less than 100 points (No), the loop process corresponding to the position range in process is terminated to return the process to Step S511, and the process is executed on the next position range. When the data amount is equal to or more than the specified value, the process is transitioned to Step S514.

Next, at Step S514, a representative wireless communication quality value is generated. Here, the representative wireless communication quality value means a value of selecting one downlink wireless communication quality in the case like FIG. 4B or FIG. 4E in which a plurality of the downlink wireless communication qualities exist for a single key constituted of the time and the wireless mobile station ID. It is also a value of selecting one uplink wireless communication quality in the case like FIG. 4C, FIG. 4D, or FIG. 4E in which a plurality of the uplink wireless communication qualities exist for a single key constituted of the time and the wireless mobile station ID. As a selection method of the representative wireless communication quality, for example, not the missing value but the wireless communication quality value, the reception electric power, and the SNR with the largest values can be selected among the plurality of wireless communication qualities.

Figure 6A:
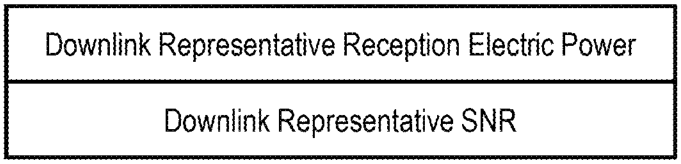
FIG. 6A is an exemplary information structure of representative wireless communication quality according to the embodiment of the present invention.
Figure 6B:
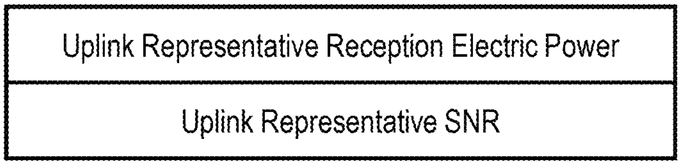
FIG. 6B is an exemplary information structure of the representative wireless communication quality according to the embodiment of the present invention.
Figure 6C:
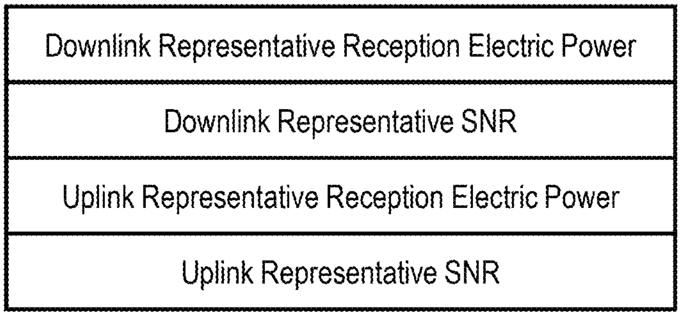
FIG. 6C is an exemplary information structure of the representative wireless communication quality according to the embodiment of the present invention.

When the wireless communication quality information stored in the wireless station information storing section 211 is in the format of FIG. 4A or FIG. 4B, the representative wireless communication quality value is an arrangement made of two elements, a downlink representative reception electric power and a downlink representative SNR, as illustrated in FIG. 6A. When the wireless communication quality information stored in the wireless station information storing section 211 is in the format of FIG. 4C, the representative wireless communication quality value is an arrangement made of two elements, an uplink representative reception electric power and an uplink representative SNR as illustrated in FIG. 6B. When the wireless communication quality information stored in the wireless station information storing section 211 is in the format of FIG. 4D or FIG. 4E, the representative wireless communication quality value is an arrangement made of four elements, the downlink representative reception electric power, the downlink representative SNR, the uplink representative reception electric power, and the uplink representative SNR as illustrated in FIG. 6C.

At subsequent Step S515, features of the distribution of the representative wireless communication quality values are learnt. As a learning method of the distribution, for example, a method in which a Gaussian distribution having a dimension equal to the number of the elements of the representative wireless communication quality value is assumed, and an average value and a standard deviation for each dimension of the Gaussian distribution with which, for example, 95% of the target data falls within 3σ are calculated may be employed. As another learning method of the distribution, for example, a method in which a One Class SVM classifier is constituted such that 95% of the data falls within a normal value range may be employed.

Next, at Step S516, the learning result is stored in the learning result storing section 212 as the classifier. The above processes are repeated, and when there remains a position range that has not yet been processed at Step S517, the process is returned to Step S511, and when the process on all the position ranges has been terminated, the learning step S202 is terminated.

Figure 7:
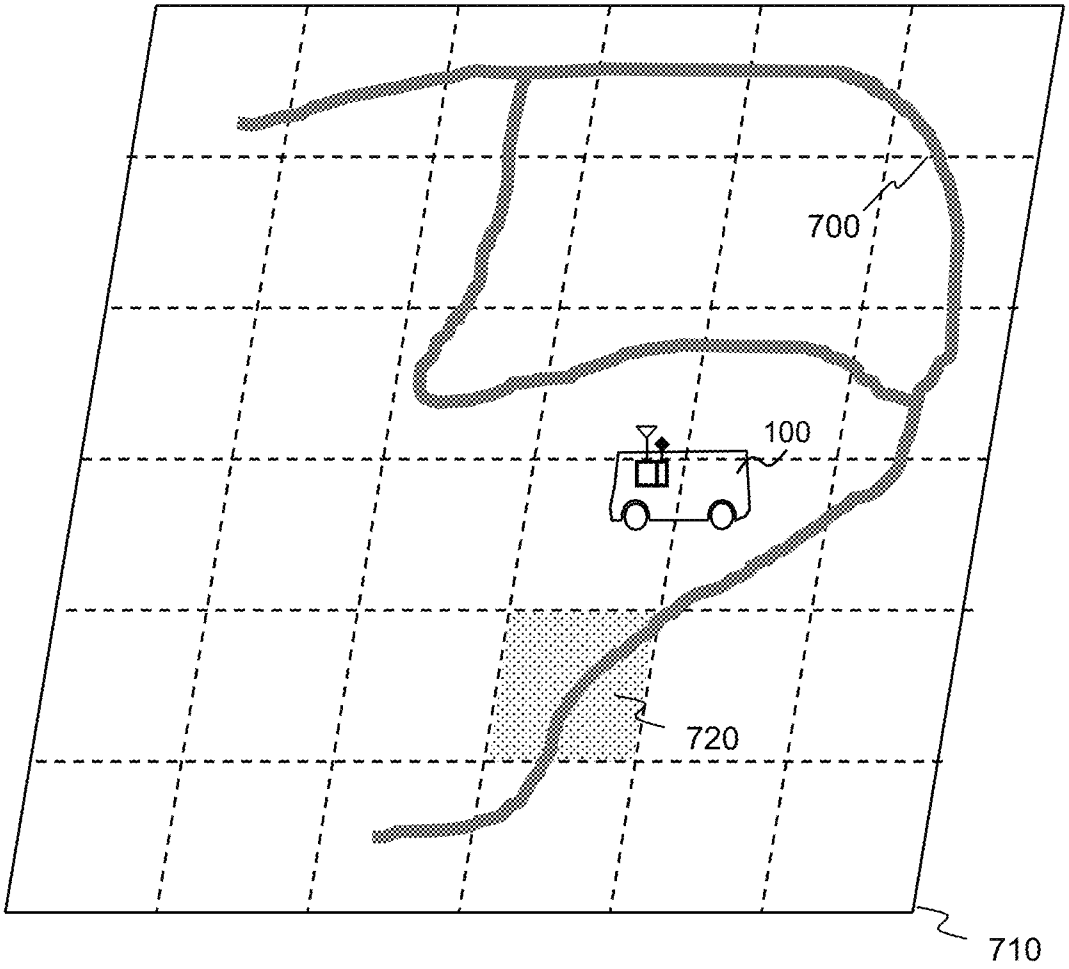
FIG. 7 is an example of a position range according to the embodiment of the present invention.

FIG. 7 is an example of the position range according to the embodiment. In the embodiment, an area entire range 710 is defined to include a travel trajectory 700 of the mobile vehicle 100, and the area entire range 710 is, for example, evenly divided into a plurality of subdivided areas 720. The subdivided area 720 is a process unit of the learning process by the learning processing section 202.

The outlier detection processing section 203 extracts the wireless communication quality information and the position information stored in the wireless station information storing section 211 for each constant time range and each constant position range, classifies the extracted information using the classifier stored in the learning result storing section 212, and stores the classified results in the detection result storing section 213.

Figure 8:
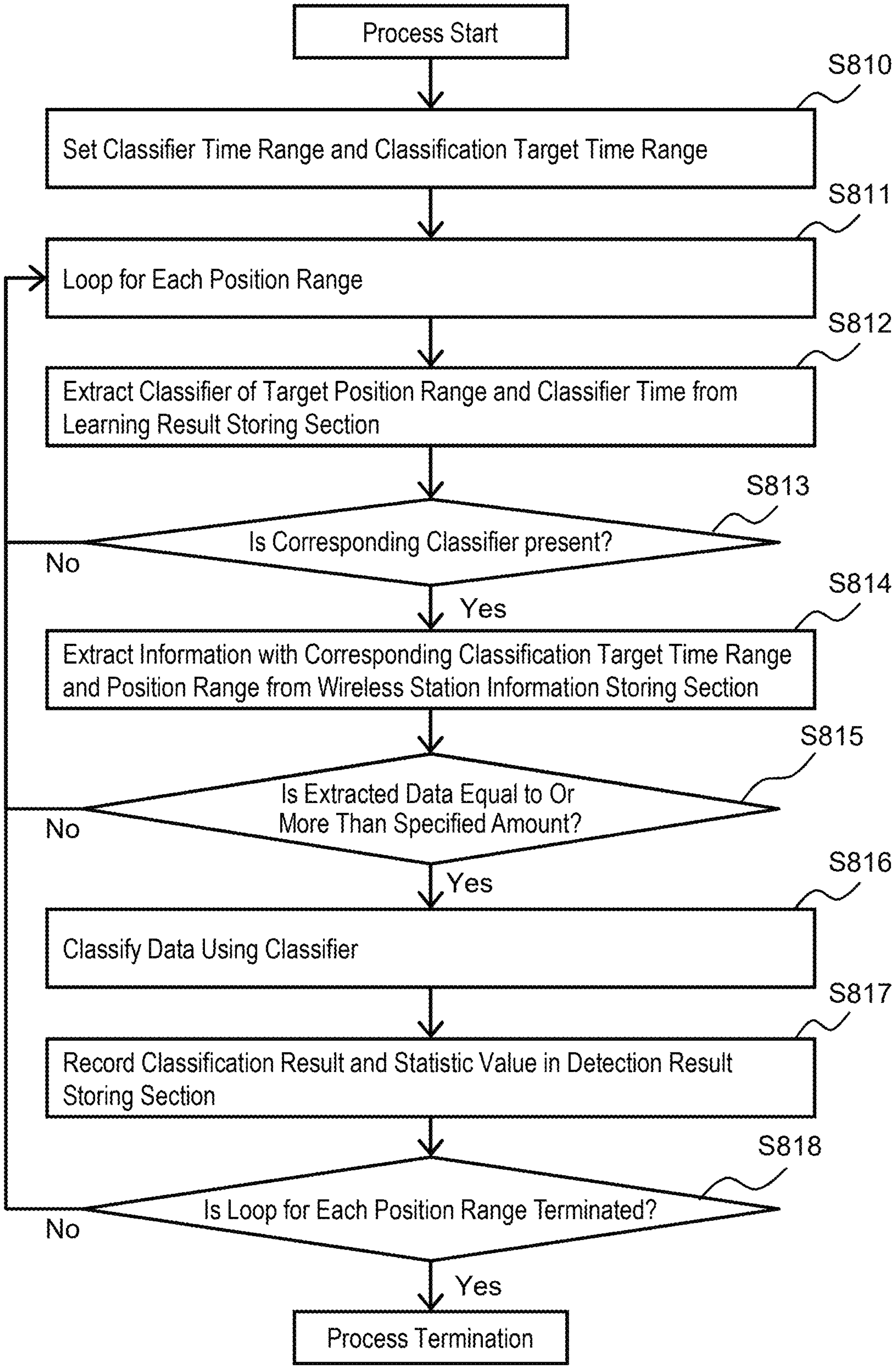
FIG. 8 is an exemplary process procedure of an outlier learning process according to the embodiment of the present invention.

With reference to the flowchart in FIG. 8, an exemplary process procedure in the outlier detection processing section 203 according to the embodiment will be described. The outlier detection processing section 203 firstly sets a time range as an outlier detection process target and a time range of the classifier used in the outlier detection process at Step S810. Here, the time range as the outlier detection process target indicates, for example, a specific time range (for example, one hour) on a specific day. The time range of the classifier used in the outlier detection process indicates, for example, a time range on the previous day (for example, 24 hours on the previous day) of the time range as the outlier detection process target.

Next, a loop process is executed for each position range from Step S811 to Step S818. At Step S812, a classifier of the target position range and the classifier time used in the outlier detection process is extracted from the learning result storing section 212.

At subsequent Step S813, whether the classifier has been extracted (whether present or not) is confirmed. When the corresponding classifier is not present in the learning result storing section 212 and the extraction has failed (No) at Step S812, the loop process on the position range in process is terminated, the process is returned to Step S811, and the process is executed on the next position range. When the classifier has been extracted, the process is transitioned to Step S814.

At Step S814, the information corresponding to the time range as the outlier detection process target set at Step S810 and the position range of the current loop process is extracted from the wireless station information storing section 211. At Step S815, a data amount of the extracted information is confirmed, and when the data amount is less than a specified value, for example, less than 50 points, the loop process corresponding to the position range in process is terminated to return the process to Step S811, and the process is executed on the next position range. When the data amount is equal to or more than the specified value, the process is transitioned to Step S816.

At Step S816, the data extracted at Step S814 is classified using the classifier extracted at Step S812. At subsequent Step S817, the classified result and statistics information are recorded in the detection result storing section 213. The classified result and the statistics information include the following as one example.

- the number of pieces of data as classification target
- the number of pieces of data within a normal value range of the classified result
- the number of pieces of data as an outlier as the result of the classification
- the average wireless communication quality value of all the data
- the average wireless communication quality value of the data within the normal value range
- the average wireless communication quality value of the data as the outlier The steps above are repeated, and, when there remains a position range on which the above-described steps have not been executed at Step S818, the process is returned to Step S811 and the same process is repeated. On the other hand, when the process on all the position ranges has been terminated, the outlier detection process is terminated. The abnormality factorial experiment processing section 204 analyzes an abnormality when the abnormality occurs in the wireless communication based on the information stored in the detection result storing section 213, and records the result in the analysis result storing section 214.

The detection result interface processing section 205 outputs the analysis result recorded in the analysis result storing section 214 to, for example, a monitor external terminal through the stationary network 120. The detection result interface processing section 205 also outputs the analysis result recorded in the analysis result storing section 214 to, for example, the monitor external terminal through the stationary network 120 after executing various processes in the learning processing section 202, the outlier detection processing section 203, and the abnormality factorial experiment processing section 204 as necessary based on an analysis request instruction requested from, for example, the monitor external terminal through the stationary network 120.

Figure 9A:
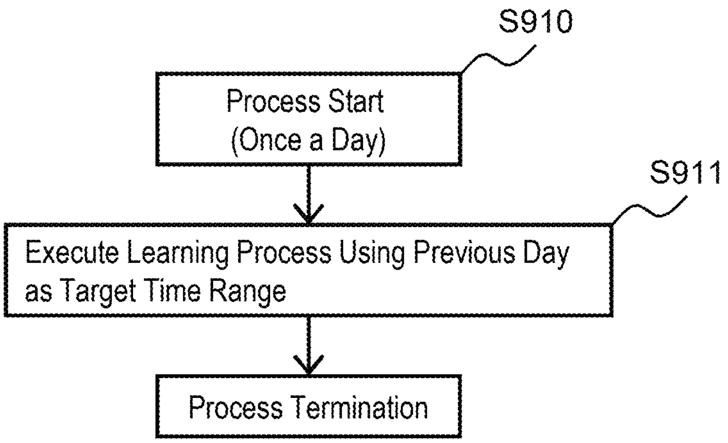
FIG. 9A is a procedure of process execution by scheduled driving of an abnormality detecting device 131 according to the embodiment of the present invention.

With reference to the flowcharts in FIG. 9A and FIG. 9B, a process procedure by scheduled driving of the abnormality detecting device 131 will be described. As the process of scheduled driving, for example, like Step S910 in FIG. 9A, once a day, the process is started at a timing where the wireless communication quality of the previous day is stored in the wireless station information storing section 211, the process of the learning processing section 202 is started using the learning target time range as the amount of the previous one day at Step S911, and the result is recorded in the learning result storing section 212.

Figure 9B:
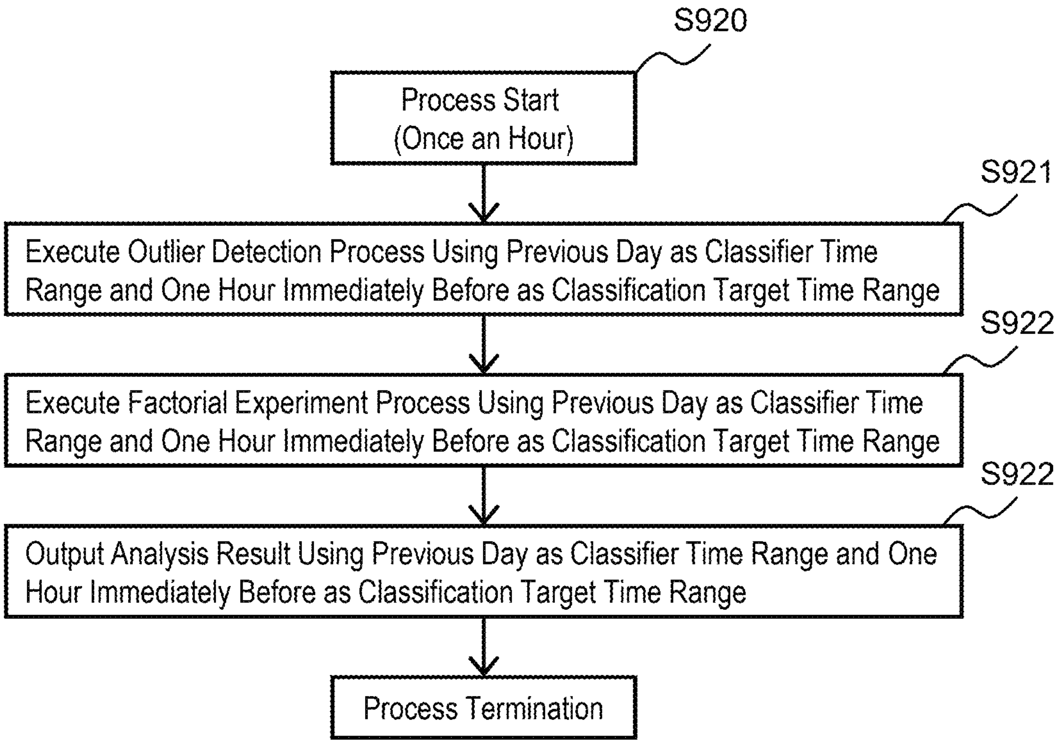
FIG. 9B is a procedure of the process execution by scheduled driving of the abnormality detecting device 131 according to the embodiment of the present invention.

As the process of scheduled driving, like Step S920 in FIG. 9B, once an hour, the process can be started at a timing where the wireless communication quality of one hour is stored in the wireless station information storing section 211. At Step S921, the outlier detection processing section 203 executes the outlier detection process with the wireless communication quality information of one hour immediately before as the classification target using the learning result of the previous day created at Step S911, and the result is recorded in the detection result storing section 213. Subsequently, at Step S922, a factorial experiment process is executed in the abnormality factorial experiment processing section 204, and the result is recorded in the analysis result storing section 214. At Step S923, the analysis result is output to the outside through the detection result interface processing section 205.

With reference to the flowchart in FIG. 10, a procedure of the detection process of the abnormality detecting device 131 when there is an analysis request (request driving) will be described. For example, when the detection result interface processing section 205 receives an analysis request instruction, the process in FIG. 10 is started.

Figure 10:
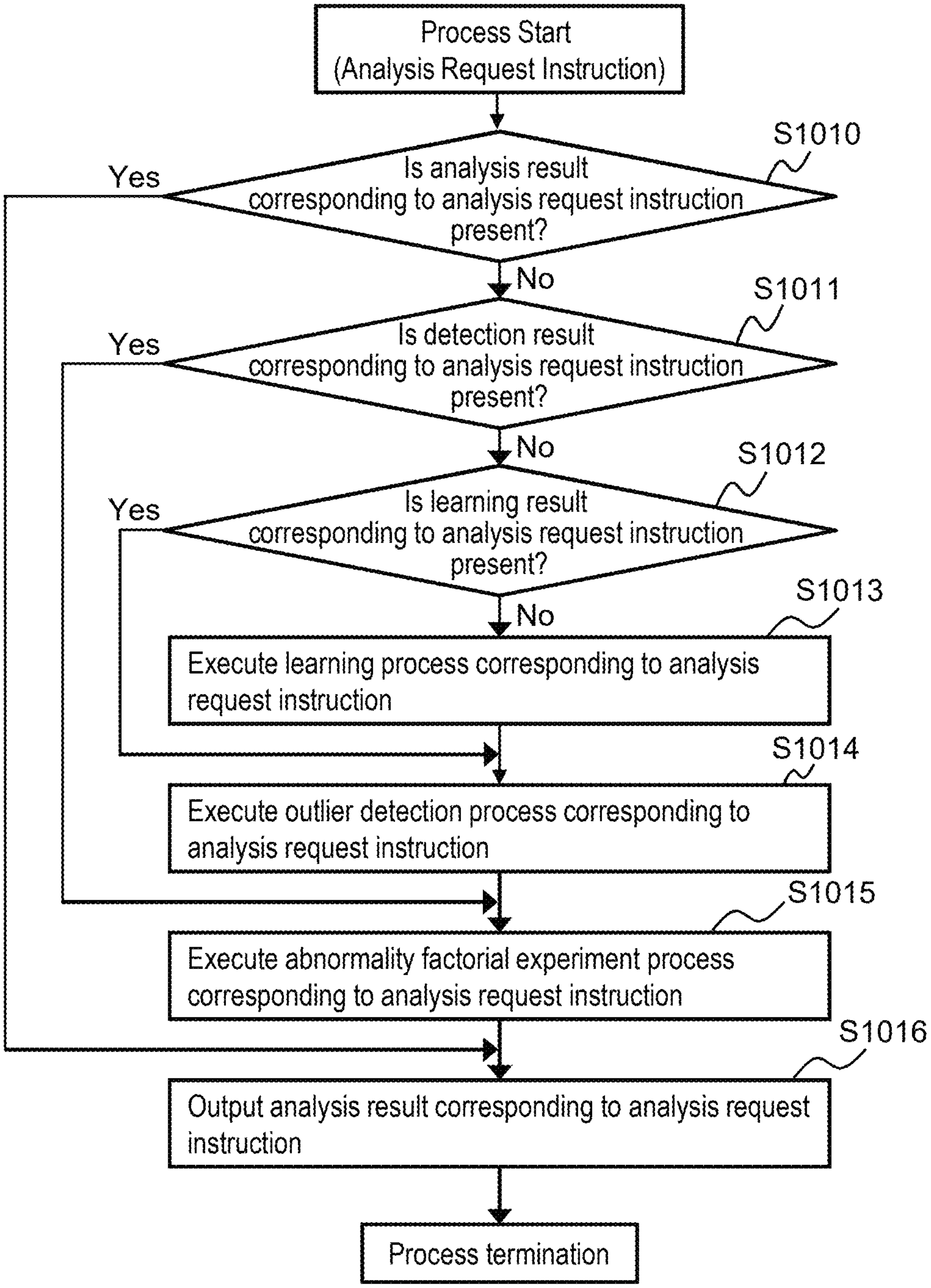
FIG. 10 is a procedure of process execution by request driving of the abnormality detecting device 131 according to the embodiment of the present invention.

Once the process in FIG. 10 is started by the analysis request, first, at Step S1010, whether the analysis result corresponding to the analysis request instruction is present in the analysis result storing section 214 or not is confirmed. When the analysis result is present, the process is transitioned to Step S1016, and when the analysis result is not present, the process is transitioned to Step S1011.

At Step S1011, whether the detection result corresponding to the analysis request instruction is present in the detection result storing section 213 or not is confirmed. When the detection result is present, the process is transitioned to Step S1015, and when the detection result is not present, the process is transitioned to Step S1012. At Step S1012, whether the learning result corresponding to the analysis request instruction is present in the learning result storing section 212 or not is confirmed. When the learning result is present, the process is transitioned to Step S1014, and when the learning result is not present, the process is transitioned to Step S1013.

At Step S1013, the learning process is executed in the learning processing section 202 by the learning target time range corresponding to the analysis request instruction received by the detection result interface processing section 205, and the result is recorded in the learning result storing section 212. At Step S1014, the outlier detection process is executed in the outlier detection processing section 203 in the time range of the classifier and the classification target corresponding to the analysis request instruction received by the detection result interface processing section 205, and the result is recorded in the detection result storing section 213. At subsequent Step S1015, the abnormality factorial experiment process corresponding to the analysis request instruction received by the detection result interface processing section 205 is executed by the abnormality factorial experiment processing section 204, and the result is recorded in the analysis result storing section 214. At Step S1016, the analysis result corresponding to the analysis request instruction received by the detection result interface processing section 205 from the information recorded in the analysis result storing section 214 is output to the outside.

Figure 11:
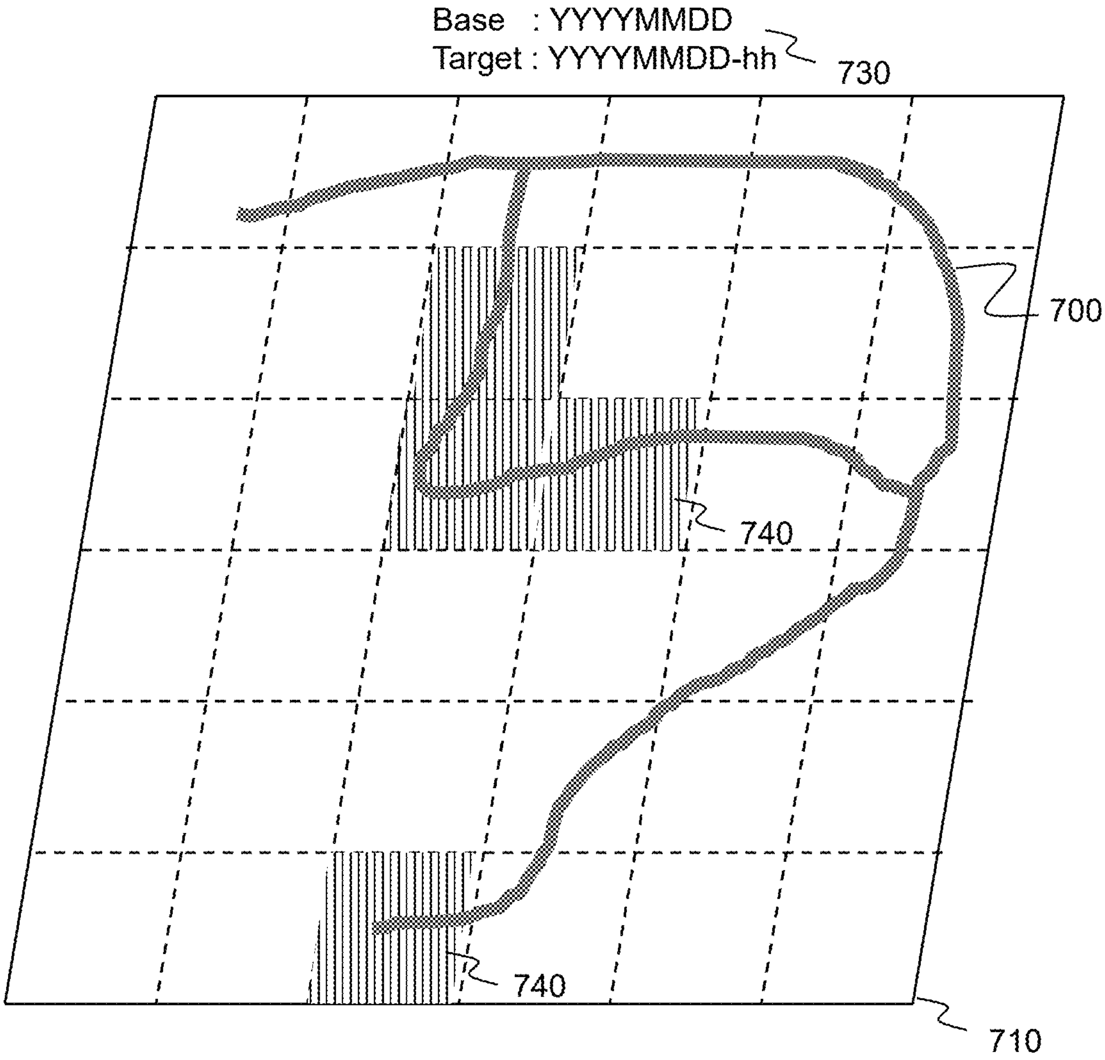
FIG. 11 is an exemplary analytical process executed in an abnormality factorial experiment process according to the embodiment of the present invention.

With reference to FIG. 11, an exemplary analytical process by the abnormality factorial experiment processing section 204 will be described. In the analytical process example in FIG. 11, the travel trajectory 700 of the mobile vehicle 100 and the area entire range 710 are displayed on the display 131D of the abnormality detecting device 131, the learning target time range of the classifier used in the classification process and the target time range of the data as the classification target are displayed as time range information 730.

An outlier ratio obtained by dividing the number of pieces of data turned out to be outliers as the result of the classification in the outlier detection processing section 203 by the number of all pieces of data is calculated for each position range, and the position range having the outlier ratio of a threshold value (for example, 0.5 or more) is displayed highlighted as indicated by, for example, a reference numeral 740. The area of the reference numeral 740 is recognized as the area where an abnormality occurs. When there are the certain number or more of the areas where the abnormality occurs, it can be recognized that the abnormality occurs in the whole wireless communication system.

Figure 12:
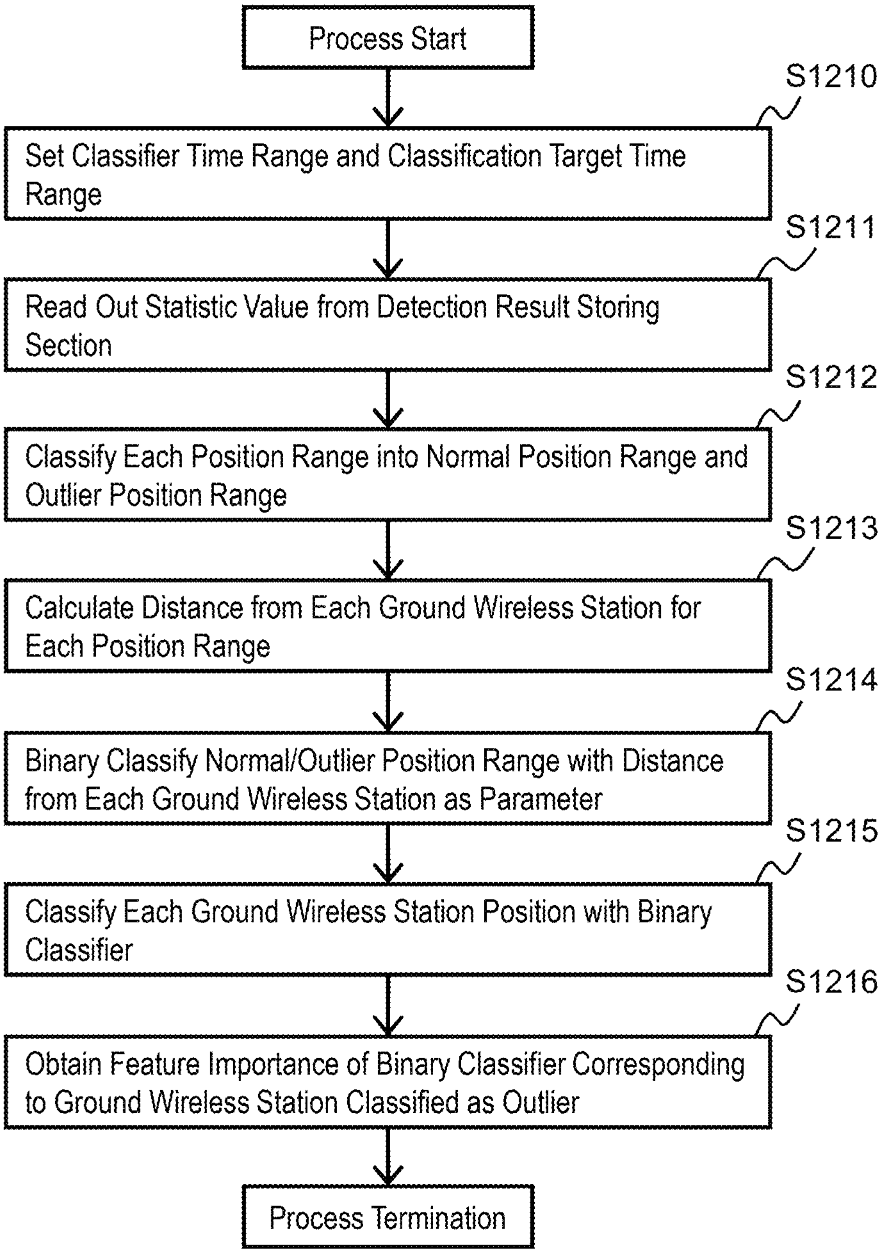
FIG. 12 is a process procedure of another exemplary analytical process executed in the abnormality factorial experiment process according to the embodiment of the present invention.

With reference to the flowchart in FIG. 12, another exemplary procedure of the analytical process executed in the abnormality factorial experiment processing section 204 will be described. In the analytical process in FIG. 12, first, at Step S1210, the learning time range of the classifier and the time range of the wireless communication quality information as the classification target are set. Next, at Step S1211, a statistic value corresponding to the time ranges set at Step S1210 is read out from the detection result storing section 213.

Figure 13:
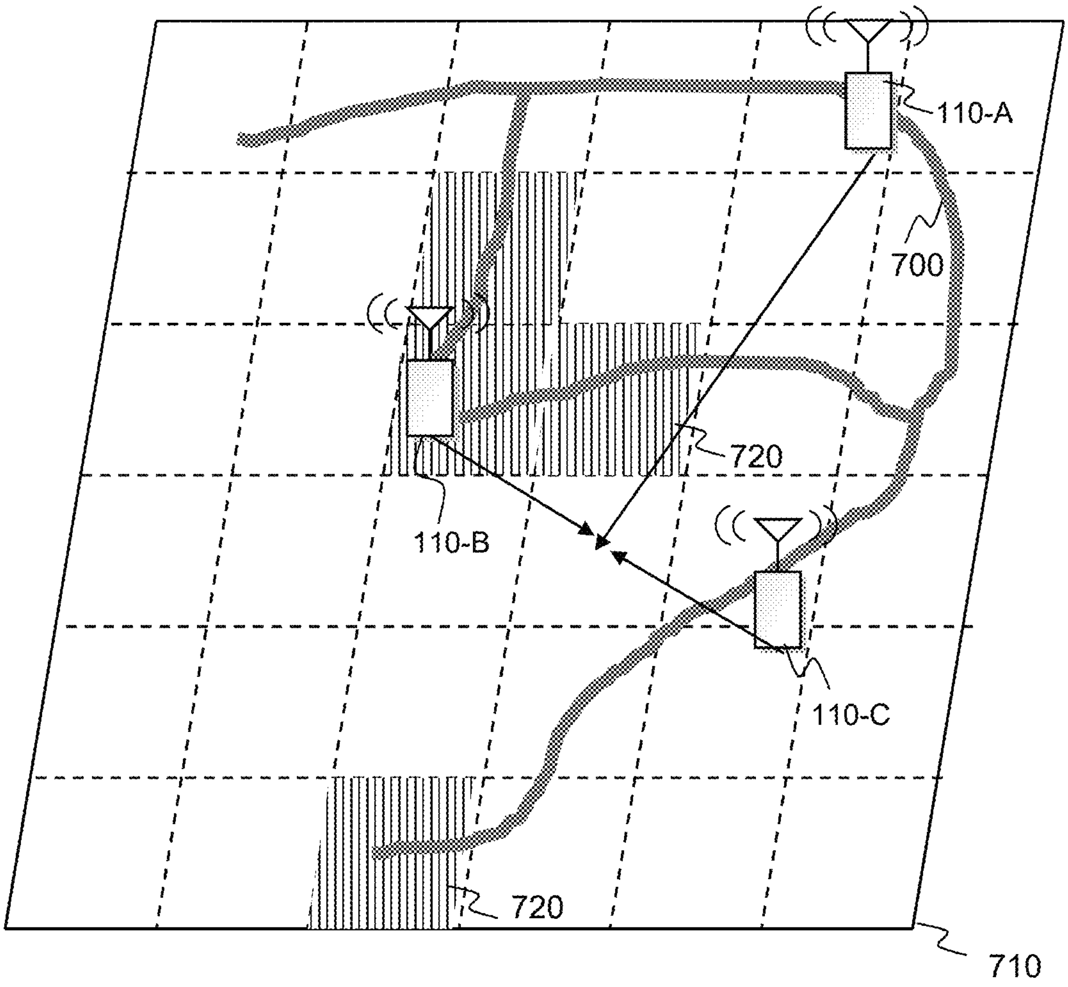
FIG. 13 is one explanatory diagram of another exemplary analytical process executed in the abnormality factorial experiment process according to the embodiment of the present invention.

At subsequent Step S1212, an outlier abundance ratio is calculated for each position range similarly to the analytical process in FIG. 11, and, for example, the position range with the outlier abundance ratio of 0.5 or more is classified as an outlier position range, and the position range with the outlier abundance ratio of less than 0.5 is classified as a normal position range. At Step S1213, distances from all the stationary wireless stations (ground wireless stations) 110 are calculated for each position range as exemplarily illustrated in FIG. 13. Here, the position information of the ground wireless stations 110 used for the calculation may be position information measured using, for example, GNSS or may be values stored as constants in advance.

Figure 14:
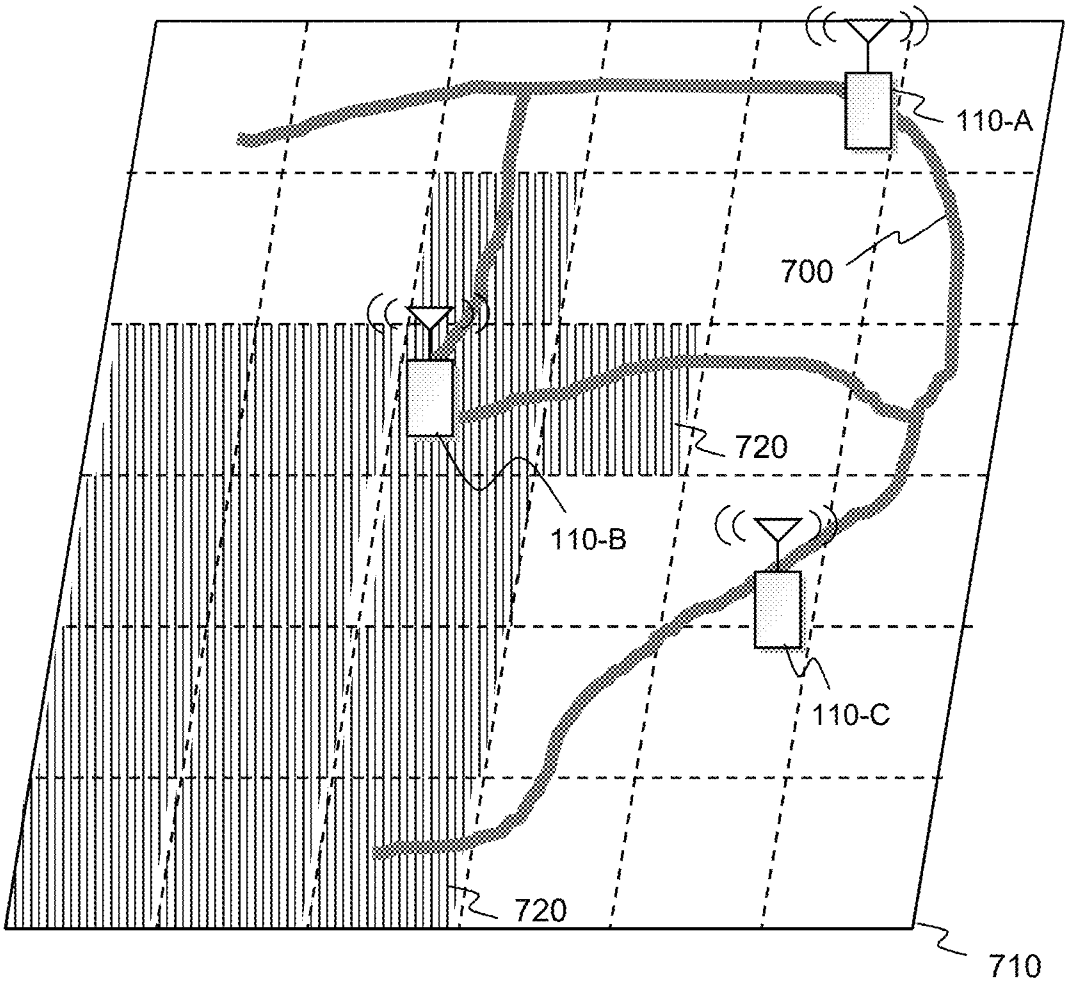
FIG. 14 is one explanatory diagram of another exemplary analytical process executed in the abnormality factorial experiment process according to the embodiment of the present invention.

At subsequent Step S1214, the classification result of the normal position range and the outlier position range by the outlier abundance ratio obtained at Step S1212 is used as teacher data, the distances from the respective ground wireless stations are used as a parameter, and the learning process of a binary classifier is executed. Furthermore, using the learnt binary classifier, as exemplarily illustrated in FIG. 14, the binary classifier classifies the area entire range 710 into the normal position range and the outlier position range. Here, the used binary classifier may be a simple classifier, such as a decision tree, or may be a classifier, such as Adaboost by a combination of decision trees.

Next, at Step S1215, whether the installation positions of the respective ground wireless stations 110 are in the outlier position range or in the normal position range is classified. As the result, when the ground wireless station 110 is classified as the outlier position range, it is allowed to recognize that the ground wireless station has some sort of communication failure (for example, communication disruption).

At subsequent Step S1216, a feature importance during binary classifier learning are evaluated, in which it is allowed to assume that the importance of the ground wireless station 110 classified as the normal position range at Step S1215 is 0, and the possibility of the occurrence of abnormality is allowed to be recognized to increase in height as the feature importance increases in height for the ground wireless station 110 classified as the outlier position range at Step S1215.

Figure 15:
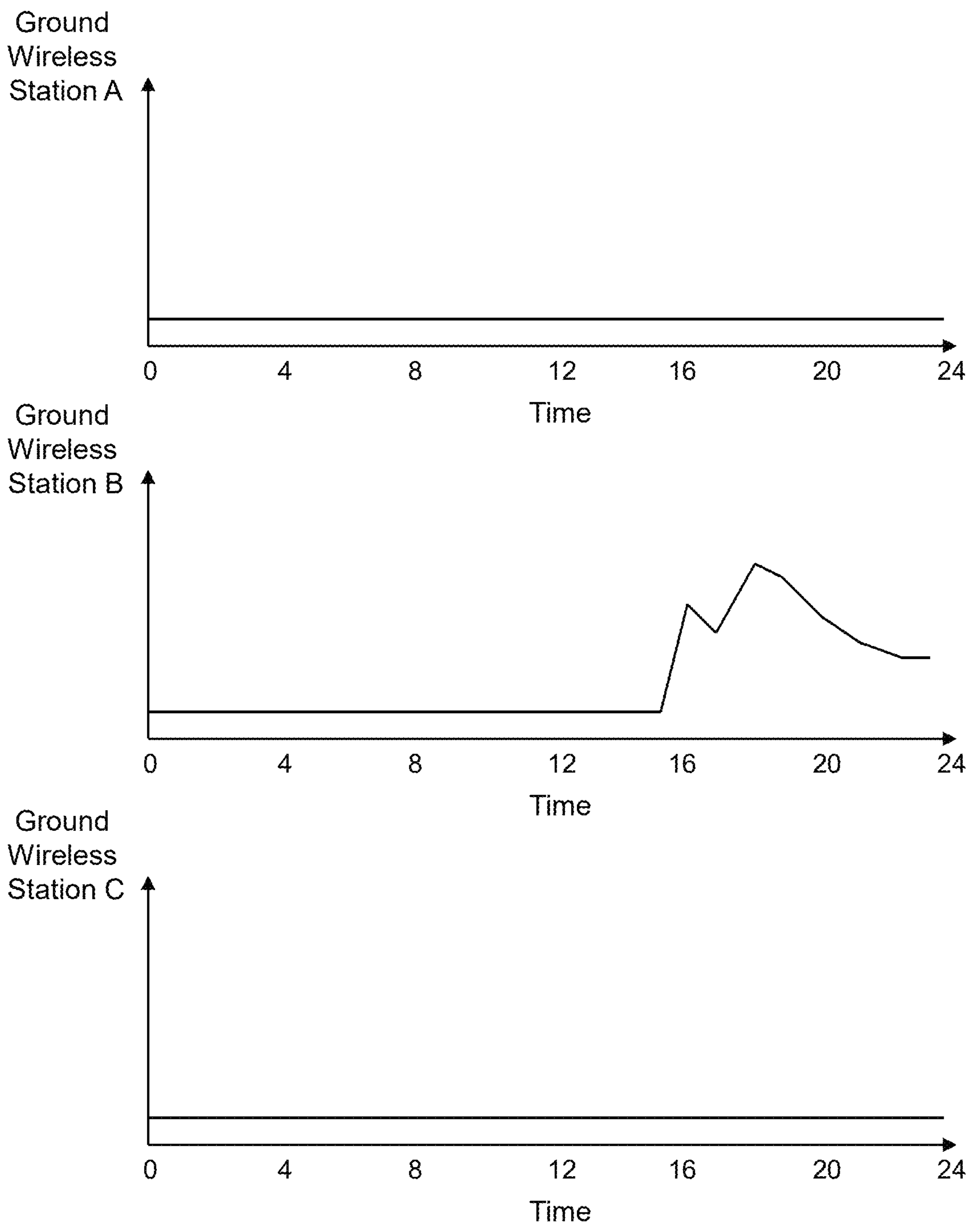
FIG. 15 is yet another exemplary analytical process executed in the abnormality factorial experiment process according to the embodiment of the present invention.

FIG. 15 is another exemplary analytical process executed in the abnormality factorial experiment processing section 204. The horizontal axis in the graph indicates a temporal change (time), and the vertical axis indicates a feature importance obtained by the procedure in FIG. 12 per hour. Confirming the temporal variation of the values of the feature importance enables estimating the time range in which the abnormality has occurred for each ground wireless station 110.

The present invention is not limited to the above-described embodiment, and includes various modifications and equivalent configurations within the gist of the attached claims. For example, the above-described embodiment has been described in detail for easy understanding of the description of the present invention, and the present invention is not necessarily limited to those that include all the described configurations. A part of the configurations of a certain embodiment may be replaced with the configurations of another embodiment. The configurations of a certain embodiment may be added with the configurations of another embodiment. A part of the configurations of the respective embodiments may be added with another configuration, may be deleted, and may be replaced.

A part or all of them may be, for example, achieved by hardware, such as an integrated circuit. The above-described respective configurations, functions, processing sections, processing means, and the like may be achieved by software with which the processor interprets and executes the computer programs achieving the respective functions. When a plurality of the same functions are present in terms of configuration, the hardware or software achieving the respective functions may be separately implemented, or one implemented hardware or software may be used in a time multiplexed manner to execute a plurality of processes. Even in the case of a single function in terms of configuration, a plurality of hardware or software having the same function may be used to execute a distributed process.

The programs achieving the respective functions, tables, and information, such as files, can be stored on a storage device, such as a memory, a hard disk and an SSD (Solid State Drive), or a recording medium, such as an IC card, an SD card, and a DVD.

In addition, control lines and information lines considered to be necessary for explanation are described, but not all the control lines and the information lines necessary for implementation are described. In practice, almost all the configurations may be considered to be connected to one another.

Reference Signs List

100 Mobile vehicle
101 Mobile wireless station
102 Position sensor
110 Stationary wireless station
120 Stationary network
130 Control station
131 Abnormality detecting device
140 Mobile network
201 Information interface processing section
202 Learning processing section
203 Outlier detection processing section
204 Abnormality factorial experiment processing section
205 Detection result interface processing section
211 Wireless station information storing section
212 Learning result storing section
213 Detection result storing section
214 Analysis result storing section
301 CPU/DSP
302 Storage section (memory)
303 Logic circuit
304 LAN I/F
305 Bus

The invention claimed is:

1. A wireless communication system in a control system including a control station and a plurality of mobile vehicles connected to the control station via wireless communication, wherein the plurality of mobile vehicles or a stationary wireless station connected to the plurality of mobile vehicles by wireless communication periodically measures position information and wireless communication quality information indicative of quality of the wireless communication, and reports the measurement results to the control station, wherein the control station defines travel trajectories of the plurality of mobile vehicles and an area including the travel trajectories based on the position information reported from the plurality of mobile vehicles, divides the area into a plurality of subdivided areas, groups measurement results belonging to a first time range as a learning target among the measurement results reported from the plurality of mobile vehicles to correspond to the plurality of subdivided areas based on the position information, and learns a distribution of the wireless communication quality information for each grouped subdivided area, wherein the control station obtains a measurement result belonging to a second time range as a detection process target different from the first time range among the measurement results reported from the plurality of mobile vehicles, and derives an outlier abundance ratio for each of the subdivided areas in the measurement result belonging to the second time range using the distribution of the wireless communication quality information for each of the learnt subdivided areas, wherein the control station includes an abnormality detecting device that detects an occurrence of abnormality of the wireless communications in each of the plurality of subdivided areas in the second time range based on the outlier abundance ratio, and the abnormality detecting device displays the area, each of the plurality of subdivided areas, and the travel trajectory of the mobile vehicle, and includes a display that highlights and displays the subdivided area where the abnormality occurs in wireless communication among the plurality of subdivided areas.

2. The wireless communication system according to claim 1, wherein the control station determines that the wireless communication system has an abnormality when the subdivided area having the outlier abundance ratio of a threshold value or more is present.

3. The wireless communication system according to claim 1, further comprising an abnormality detecting device that executes a learning process of a binary classifier with data in which, when the outlier abundance ratio for each of the subdivided areas is equal to or more than the threshold value, the subdivided area is classified as an outlier subdivided area, and, when the outlier abundance ratio is less than the threshold value, the subdivided area is classified as a normal range as teacher data, wherein when a position of the mobile vehicle is classified using the binary classifier, the position of the mobile vehicle is included in the outlier subdivided area, the abnormality detecting device determines abnormality detection on the mobile vehicle.

4. A wireless communication method between a control station and a plurality of mobile vehicles connected to the control station via wireless communication, the wireless communication method comprising:

periodically measuring position information and wireless communication quality information indicative of quality of the wireless communication, and reporting the measurement results to the control station by the plurality of mobile vehicles or a stationary wireless station connected to the plurality of mobile vehicles by wireless communication;

defining travel trajectories of the plurality of mobile vehicles and an area including the travel trajectories based on the position information reported from the plurality of mobile vehicles, dividing the area into a plurality of subdivided areas, grouping measurement results belonging to a first time range as a learning target among the measurement results reported from the plurality of mobile vehicles to correspond to the plurality of subdivided areas based on the position information, and learning a distribution of the wireless communication quality information for each grouped subdivided area;

obtaining a measurement result belonging to a second time range as a detection process target different from the first time range among the measurement results reported from the plurality of mobile vehicles, and deriving an outlier abundance ratio for each of the subdivided areas in the measurement result belonging to the second time range using the distribution of the wireless communication quality information for each of the learnt subdivided areas, detecting an occurrence of abnormality of the wireless communications in each of the plurality of subdivided areas in the second time range based on the outlier abundance ratio, and displaying the area, each of the plurality of subdivided areas, and the travel trajectory of the mobile vehicle, and highlighting and displaying the subdivided area where the abnormality occurs in wireless communication among the plurality of subdivided areas.

5. The wireless communication method according to claim 4, comprising determining that the wireless communication has an abnormality when a subdivided area having the outlier abundance ratio of a threshold value or more is present.

6. The wireless communication method according to claim 4, comprising executing a learning process of a binary classifier with data in which, when the outlier abundance ratio for each of the subdivided areas is equal to or more than the threshold value, the subdivided area is classified as an outlier subdivided area, and, when the outlier abundance ratio is less than the threshold value, the subdivided area is classified as a normal range as teacher data, wherein when a position of the mobile vehicle is classified using the binary classifier, the position of the mobile vehicle is included in the outlier subdivided area, the wireless communication method determines abnormality detection on the mobile vehicle.

7. A control station that constitutes a control system connected to a plurality of mobile vehicles via wireless communication, the control station comprising an abnormality detecting device that executes abnormality detection of the wireless communication, wherein the abnormality detecting device is configured to:

periodically receive measurement results of position information and wireless communication quality information indicative of quality of the wireless communication from the plurality of mobile vehicles;

define travel trajectories of the plurality of mobile vehicles and an area including the travel trajectories based on the position information reported from the plurality of mobile vehicles, divide the area into a plurality of subdivided areas, group measurement results belonging to a first time range as a learning target among the measurement results reported from the plurality of mobile vehicles to correspond to the plurality of subdivided areas based on the position information, and learn a distribution of the wireless communication quality information for each grouped subdivided area; and obtain a measurement result belonging to a second time range as a detection process target different from the first time range among the measurement results reported from the plurality of mobile vehicles, and derive an outlier abundance ratio for each of the subdivided areas in the measurement result belonging to the second time range using the distribution of the wireless communication quality information for each of the learnt subdivided areas, wherein the abnormality detecting device that detects an occurrence of abnormality of the wireless communications in each of the plurality of subdivided areas in the second time range based on the outlier abundance ratio, and the abnormality detecting device displays the area, each of the plurality of subdivided areas, and the travel trajectory of the mobile vehicle, and includes a display that highlights and displays the subdivided area where the abnormality occurs in wireless communication among the plurality of subdivided areas.

8. The control station according to claim 7, wherein the abnormality detecting device determines that the wireless communication system has an abnormality when a subdivided area having the outlier abundance ratio of a threshold value or more is present.

9. The control station according to claim 7, wherein the abnormality detecting device executes a learning process of a binary classifier by using data in which, when the outlier abundance ratio for each of the subdivided areas is equal to or more than the threshold value, the subdivided area is classified as an outlier subdivided area, and, when the outlier abundance ratio is less than the threshold value, the subdivided area is classified as a normal range as teacher data, wherein when a position of the mobile vehicle is classified using the binary classifier, the position of the mobile vehicle is included in the outlier subdivided area, the abnormality detecting device determines abnormality detection on the mobile vehicle.

* * * * *